Jan. 6, 1925. 1,522,053
P. GRIESEMER
DEVICE FOR SHUTTING OFF THE INFLOW OR OUTFLOW OF WATER COLLECTORS
FOR DRAINING AND IRRIGATION PLANTS
Filed Feb. 26, 1923

Witnesses:

Inventor:
Paul Griesemer

Patented Jan. 6, 1925.

1,522,053

UNITED STATES PATENT OFFICE.

PAUL GRIESEMER, OF AMLIKON, SWITZERLAND.

DEVICE FOR SHUTTING OFF THE INFLOW OR OUTFLOW OF WATER COLLECTORS FOR DRAINING AND IRRIGATION PLANTS.

Application filed February 26, 1923. Serial No. 621,397.

*To all whom it may concern:*

Be it known that I, PAUL GRIESEMER, a citizen of the Swiss Confederation, residing at Amlikon, Switzerland, have invented certain new and useful Improvements in Devices for Shutting Off the Inflow or Outflow of Water Collectors for Draining and Irrigation Plants, of which the following is a specification.

This invention relates to a device for the shutting off of inflow or outflow of water collectors of draining and irrigation plants which permits to securely shut off the outflows without requiring any complicated structures, the device being simple to manipulate.

According to the invention a plate movable in guiding elements is arranged in the water collector, said guiding elements being of such a construction that the plate is pressed against the outflow by the action of its natural weight.

Figure 1:
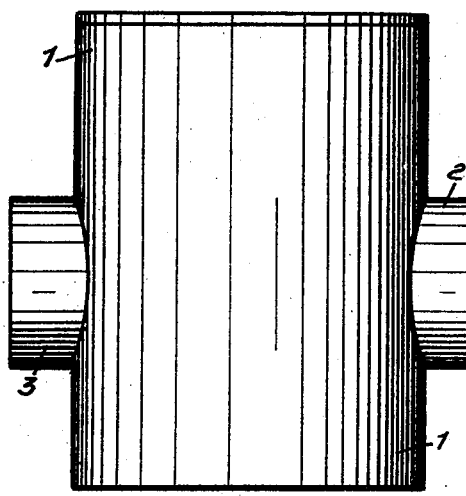
Figure 2:
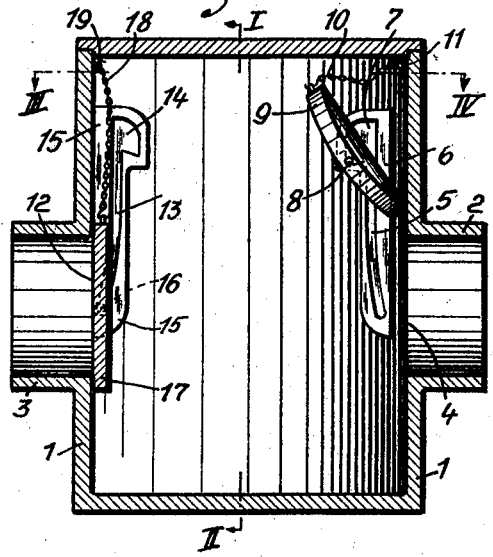
Figure 3:
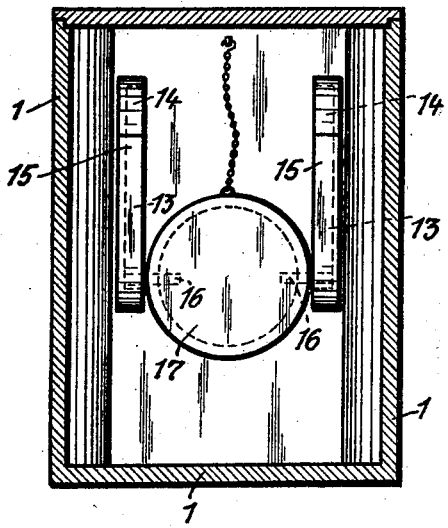
Figure 4:
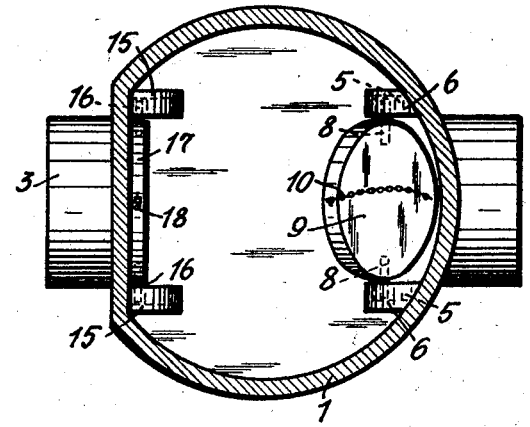

An embodiment of the invention is illustrated by way of example on the accompanying drawing, wherein:

Fig. 1 is a side elevation,
Fig. 2 a longitudinal section,
Fig. 3 a section on line I—II of Fig. 2, and
Fig. 4 a section on line III—IV of Fig. 2.

With reference to the drawing 1 is the water collector which is for instance of concrete but could be made of any other convenient material and of any suitable dimensions. The water collector has two tubular sockets 2 and 3 situated the one opposite the other and connected, the socket 2 with the supply conduit and the socket 3 with the outflow conduit. At either side of the inflow 4 two guide bars 6 having grooves 5 are arranged. The grooves 5 are enlarged at the upper ends to form a notch 7, the other part of said grooves being curved towards the inflow. In these grooves 5 the journals 8 of a disk 9 are mounted which is of curved cross section according to the cross section of the wall in which the inflow is arranged. A chain 10 attached with the one end to disk 9 is attached with its other end to an eye 11 fixed in the wall of the water collector 1. Disk 9 is shown in Fig. 2 in the position in which the inflow 4 is uncovered, the journals 8 of the disk 9 which has been pulled upward by means of chain 10 engaging with the notches 7.

In order to shut off the inflow 4 the disk 9 has merely to be slightly raised so that the journals engage with the grooves 5 and in sliding downwards in said grooves the disk comes in contact with the inner surface of the water collector so that it shuts the inflow 4. Owing to the curved shape of the grooves 5 disk 9 is pressed against the inflow 5 by the action of its natural weight so that this inflow is tightly shut.

At either side of the outflow 12 two guide bars 15 are arranged which have grooves and notches 14 for the reception of the journals 16 of the disk 17. The disk 17 is flat in accordance with the shape of the wall in which the outflow 12 is arranged. The disk 17 is suspended by a chain 18 to an eye 19, this chain being designed to lift and lower said disk. The disk 17 is shown in Fig. 2 in the position in which it shuts off the outflow 12. In order to uncover the outflow 12 disk 17 has merely to be lifted with the aid of chain 18 so that the journals 16 engage with the notches 14 of the guide grooves 15.

In order to increase the tight shutting off of the inflow or outflow the disks 9 and 17 may have on the outer surfaces a lining of convenient material, for instance rubberleather or an india rubber ring. Instead of the chain 10, 18 rods could be used which have a handle at the upper end. With large plants the disks 9, 17 could be controlled mechanically for instance by means of a spindle gear designed to raise and lower the rods. In this case the notches in the guide bars are not necessary as the rods are being secured in the raised position by means of the spindle gears.

I claim:—

1. Device for shutting off the inflow or outflow of water collectors for draining and irrigation plants comprising in combination a disk for the inflow and a disk for the outflow, bars at the right and left of the inflow and outflow in which said disks are movably guided, said bars having grooves curved in the lower part towards the inflow and outflow respectively, so that the disks are pressed against the inflow or outflow respectively by the action of their natural weight and a notch at the upper end of said grooves.

2. Device for shutting off the inflow or outflow of water collectors for draining and irrigation plants comprising in combination a disk for the outflow and a disk for the inflow, bars at the right and left of the inflow and outflow having grooves curved at the lower part towards the inflow and outflow respectively so that the disks are pressed against the inflow or outflow respectively by the action of their natural weight, notches at the upper end of said grooves, journals on said disks engaging with the grooves of the corresponding guide bars.

3. Device for shutting off the inflow or outflow of water collectors for draining and irrigation plants comprising in combination a disk for the outflow and a disk for the inflow, bars at the right and left of the inflow and outflow having grooves curved at the lower part towards the inflow and outflow respectively so that the disks are pressed against the inflow or outflow respectively by the action of their weight, notches at the upper end of said grooves, journals on said disks engaging with the grooves of the corresponding guide bars, and a chain attached to each disk designed to raise the disk or to release the same.

4. Devices for shutting off the inflow or outflow of water collectors for drainging and irrigation plants comprising in combination a disk for the inflow and a disk for the outflow, bars at the right and left of the inflow and outflow having grooves curved at the lower part towards the inflow and outflow respectively so that the disks are pressed against the inflow or outflow respectively by the action of their natural weight, notches at the upper end of said grooves, journals on said disks engaging with the grooves of the corresponding guide bars, a chain attached to each disk designed to raise the disk or to release the same, and a lining of packing material on the outer surface of each disk to increase the tight shutting off of the inflow or outflow respectively.

In testimony whereof I affix my signature in presence of two witnesses.

PAUL GRIESEMER.

Witnesses:
  CH. MULLIERO.
  B. RUOPFLI.